April 30, 1929.  J. A. BOSMANS  1,710,721
POWER PLANT
Filed Feb. 7, 1927   7 Sheets-Sheet 1
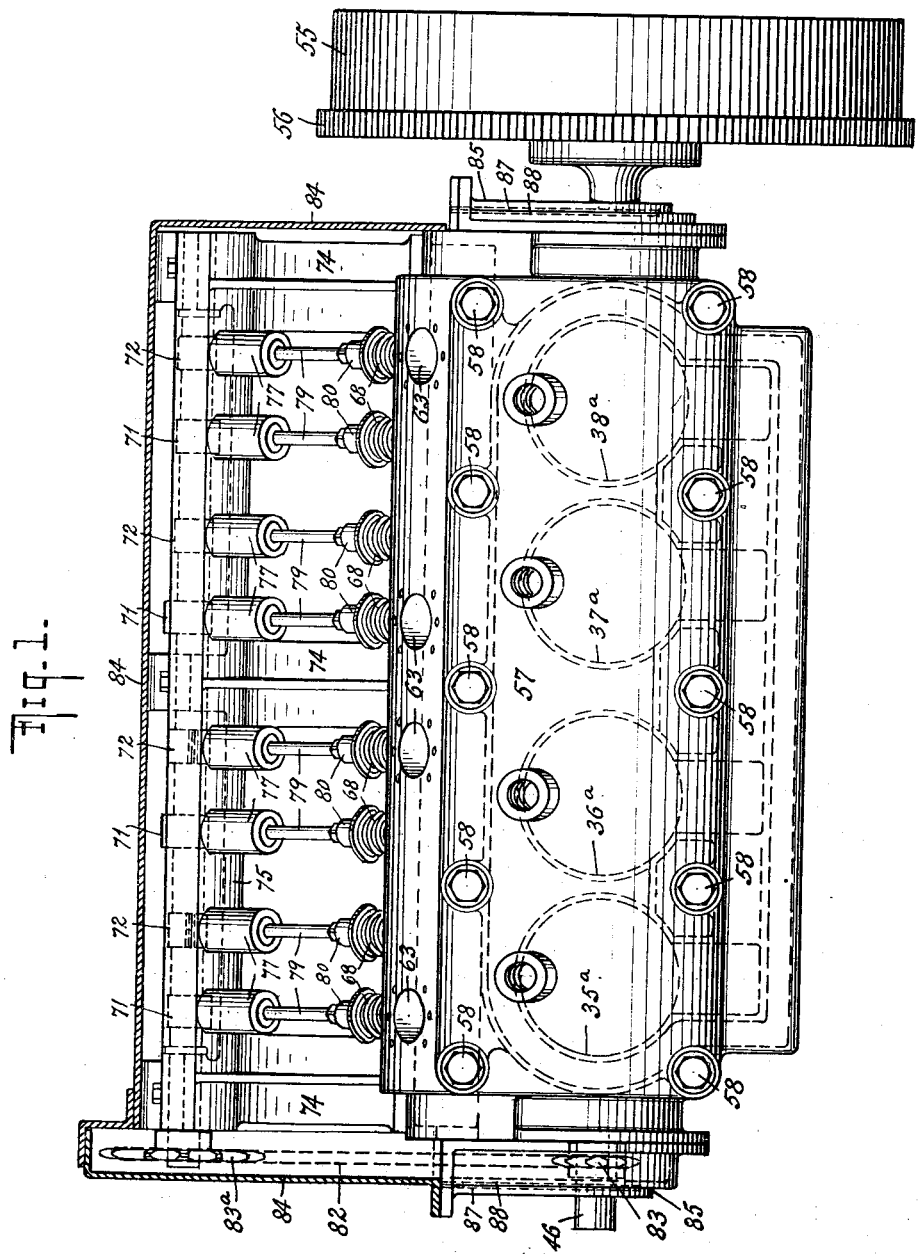
WITNESS
INVENTOR
JOHN A. BOSMANS
BY
ATTORNEYS

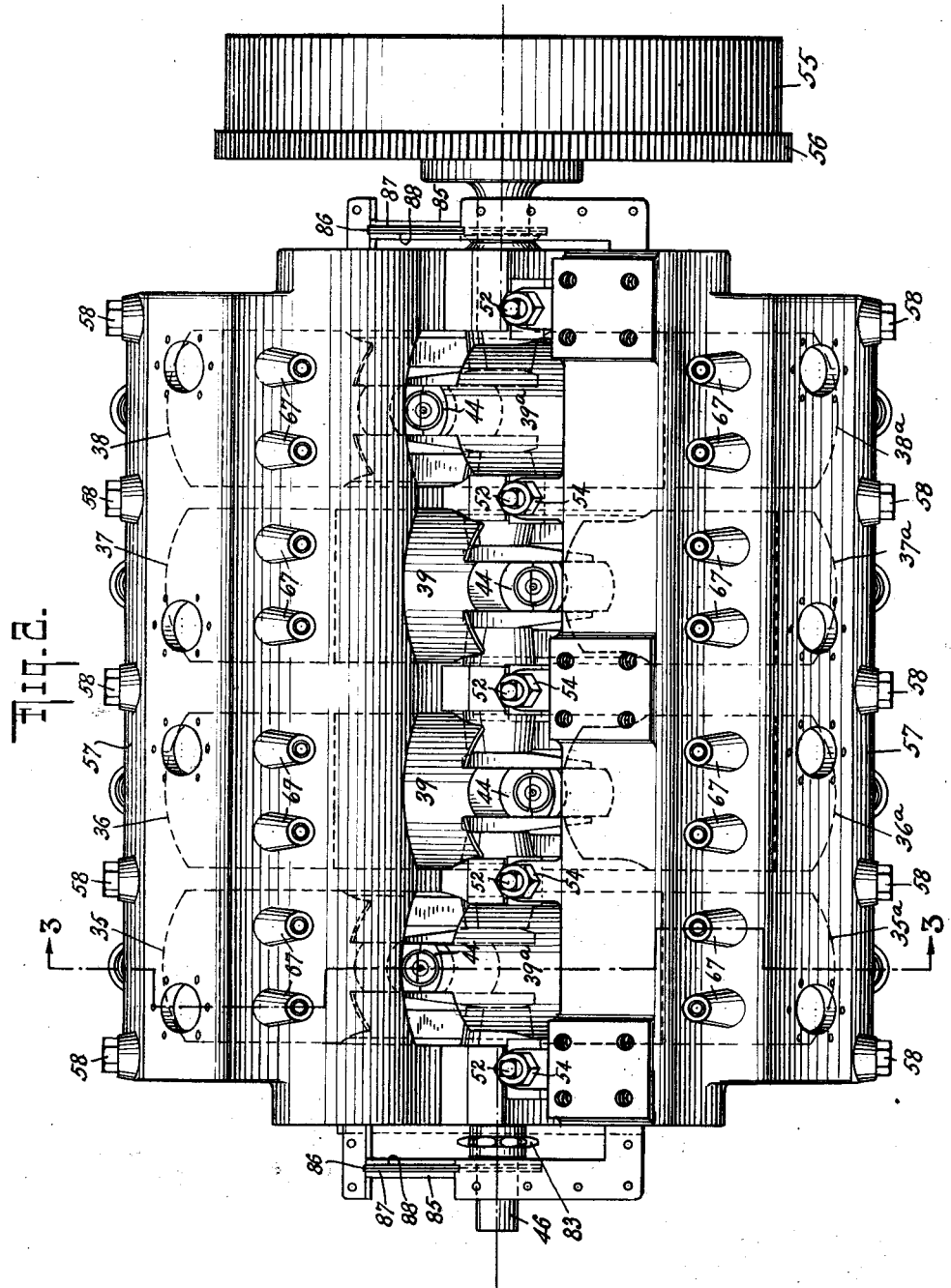

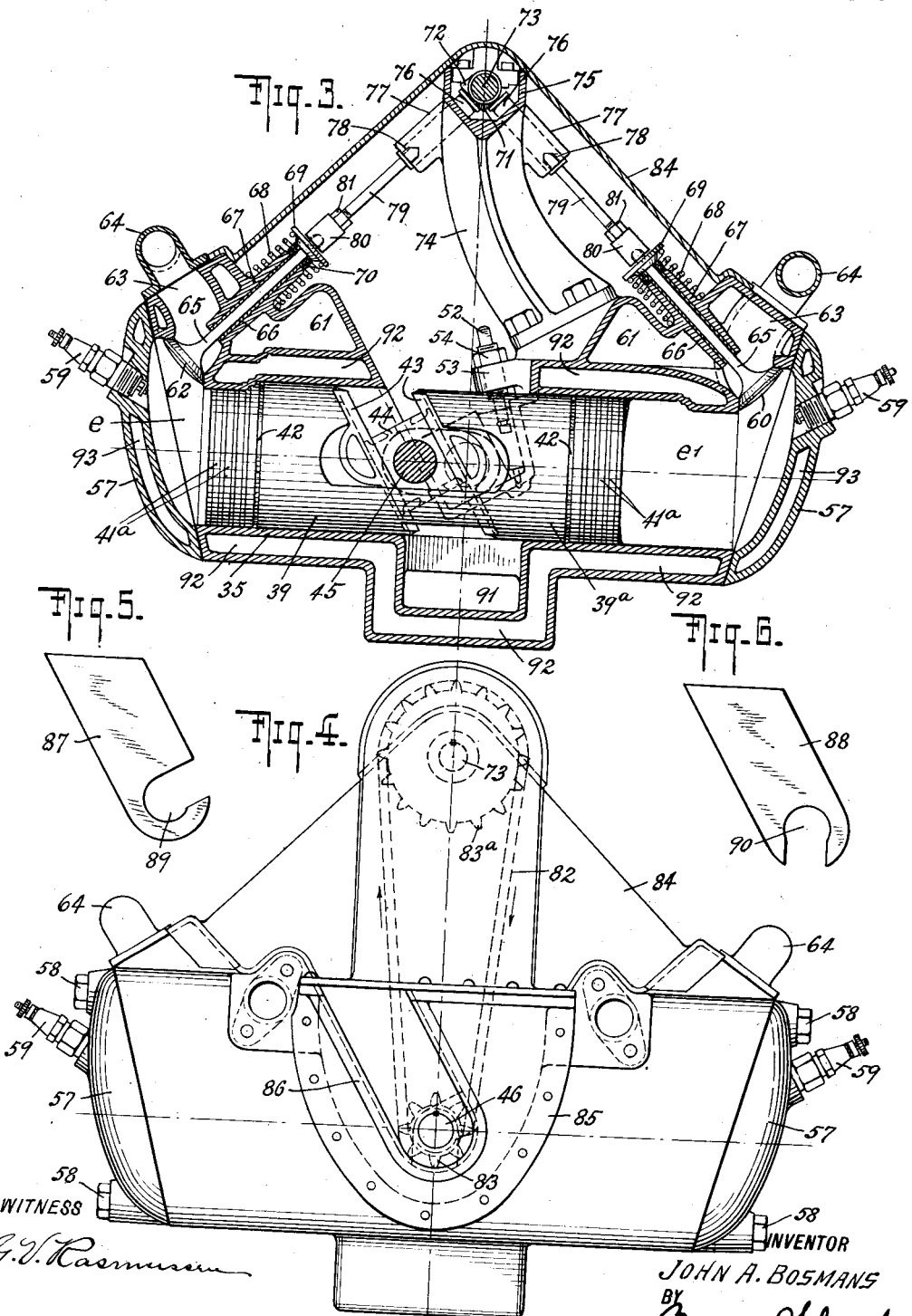

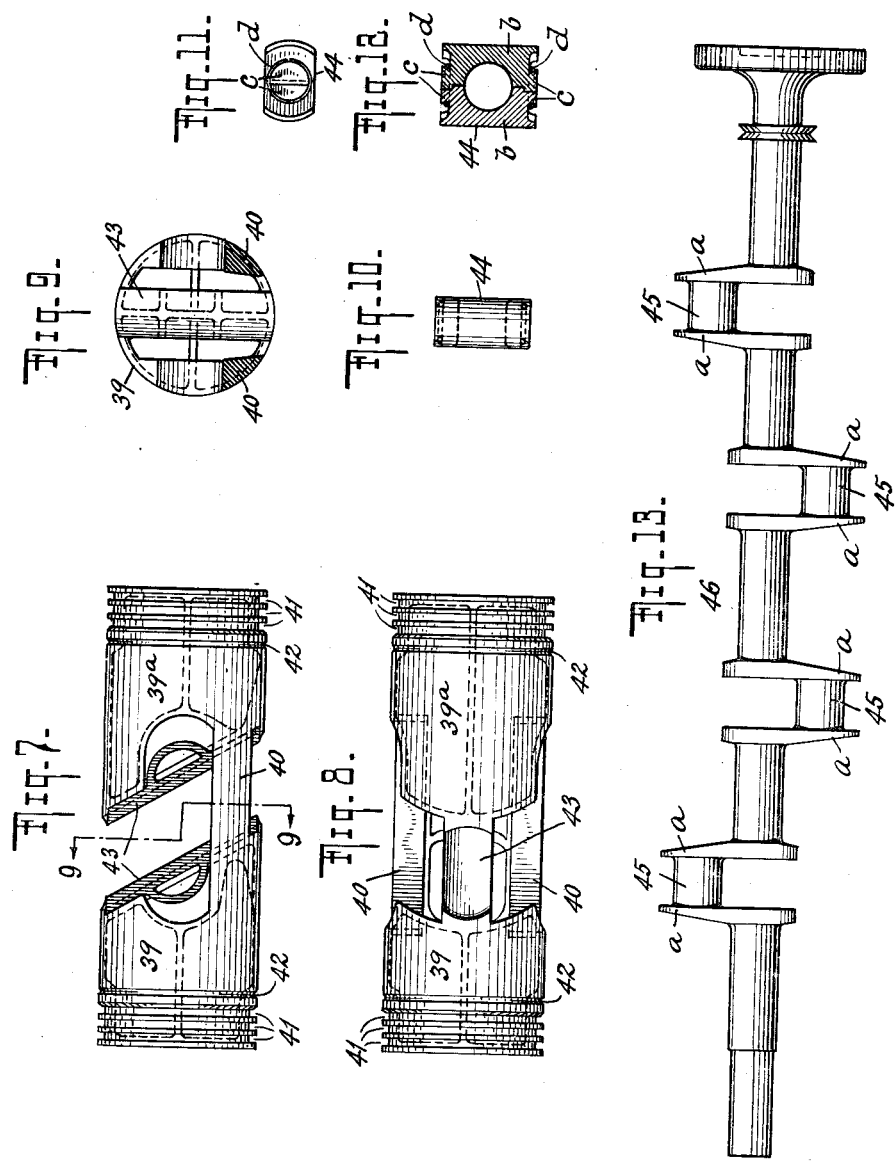

April 30, 1929.  J. A. BOSMANS  1,710,721
POWER PLANT
Filed Feb. 7, 1927  7 Sheets-Sheet 5
Fig. 14.
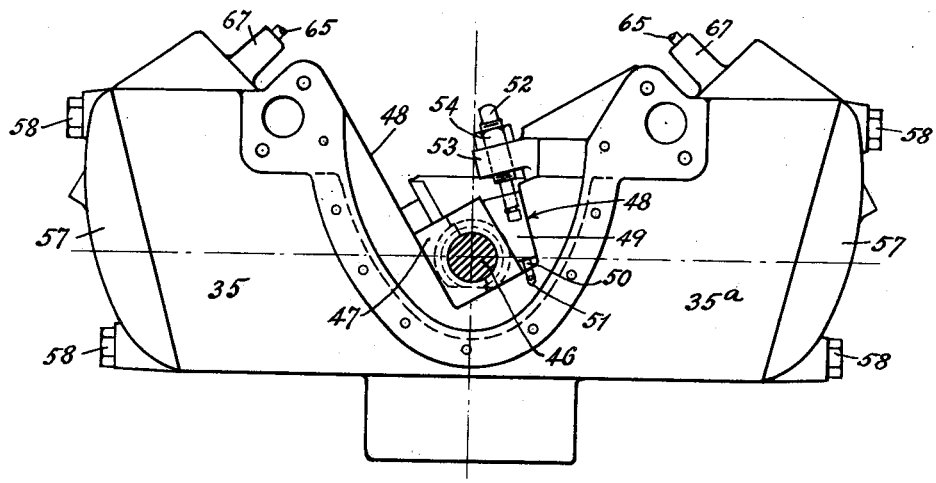
Fig. 15.    Fig. 16.    Fig. 17.    Fig. 18.    Fig. 19.
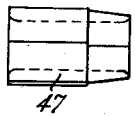 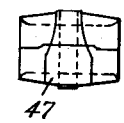 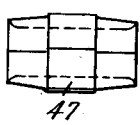 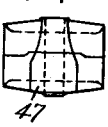 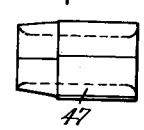
Fig. 20.    Fig. 21.    Fig. 22.    Fig. 23.    Fig. 24.
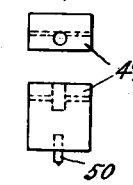 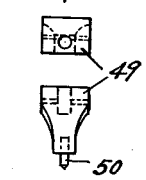 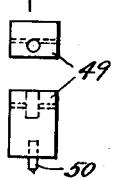  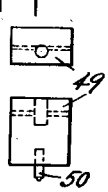
WITNESS
G. V. Rasmussen
INVENTOR
JOHN A. BOSMANS
BY
ATTORNEYS

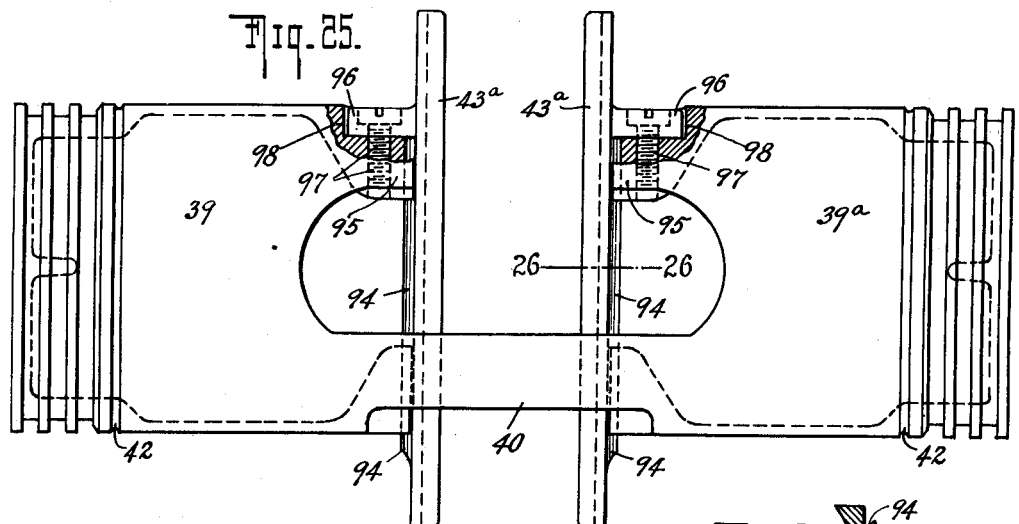
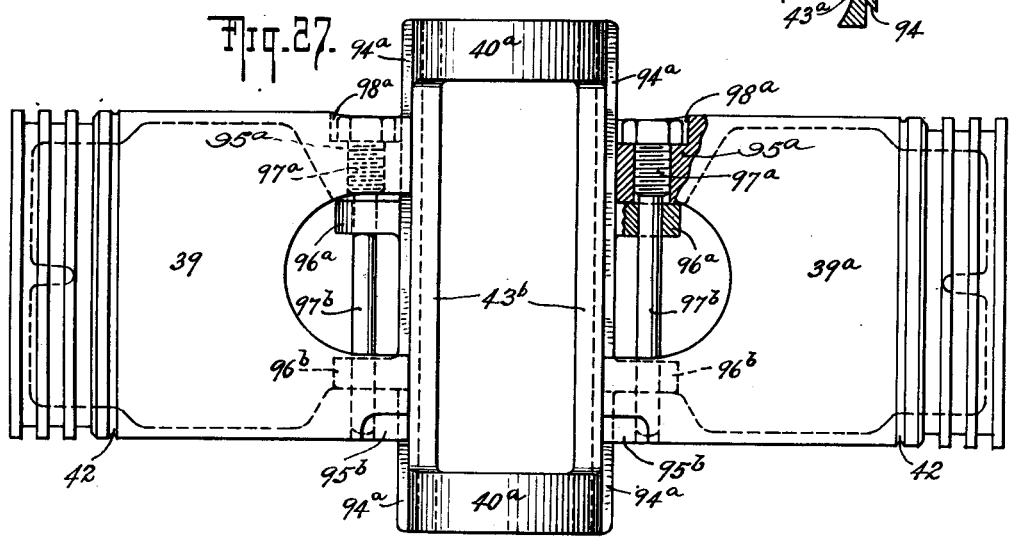
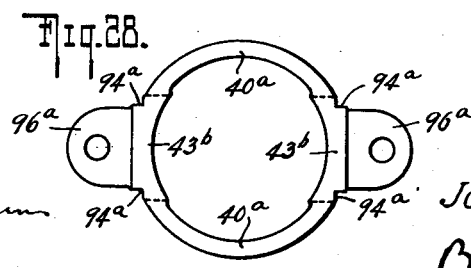

April 30, 1929.  J. A. BOSMANS  1,710,721
POWER PLANT
Filed Feb. 7, 1927   7 Sheets-Sheet 7

WITNESS

INVENTOR
JOHN A. BOSMANS
BY
ATTORNEYS

Patented Apr. 30, 1929.

1,710,721

UNITED STATES PATENT OFFICE.

JOHN A. BOSMANS, OF BROOKLYN, NEW YORK, ASSIGNOR, BY DIRECT AND MESNE ASSIGNMENTS TO BOSMIL ENGINE CORPORATION, A CORPORATION OF DELAWARE.

POWER PLANT.

Application filed February 7, 1927. Serial No. 166,314.

My invention relates to power plants and more particularly to that class of such plants which include reciprocating pistons and has for its object to provide a plant or apparatus of the indicated type which is simple and compact in design with the overall dimensions of exceptional smallness per horse power and which operates with maximum smoothness, power and quietness and with practically no vibration. The invention contemplates particularly the production of an internal combustion engine of novel construction and maximum efficiency, and embodying the features recited hereinbefore. Other more specific objects will appear from the description hereinafter and the features of novelty will be pointed out in the claims.

For the purpose of illustrating an example of the invention I have shown it in the accompanying drawings as embodied in an internal combustion engine for automotive vehicles for which it is particularly adapted; it is however to be distinctly understood that the illustrated example is in no sense intended to define the limits of the invention.

Figure 29:
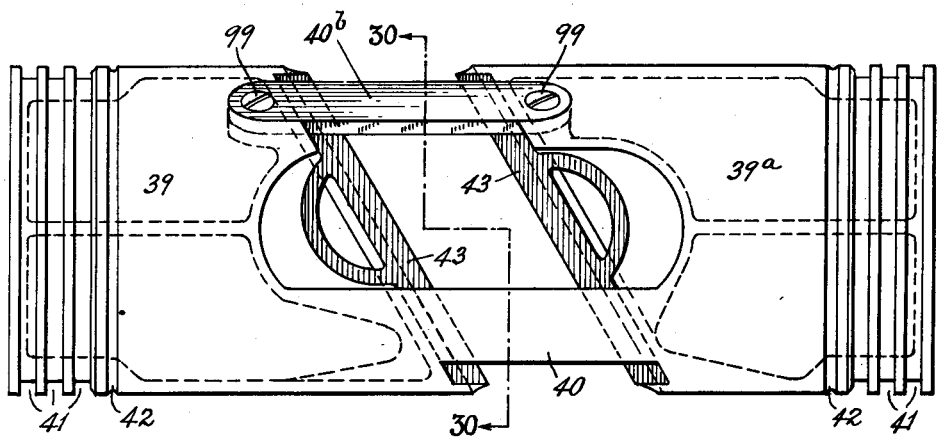
Figure 30:
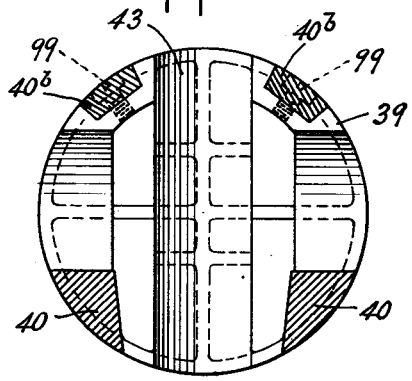

In said drawings Fig. 1 is a side elevation of the power plant; Fig. 2 is a plan view with parts omitted for clearness; Fig. 3 is a cross-section on the line 3—3 of Fig. 2; Fig. 4 is an end elevation; Figs. 5 and 6 are details of sealing units forming part of the power plant; Fig. 7 is a side elevation of one form of the pistons; Fig. 8 is a plan view thereof; Fig. 9 is a sectional view on the line 9—9 of Fig. 7; Fig. 10 is an edge view of one of the sliding blocks included in the power plant; Fig. 11 is an end view thereof; Fig. 12 is a central vertical section of said block; Fig. 13 is a view of the crank-shaft as embodied in the power plant of the illustrated example; Fig. 14 is an end view of the plant, partly in section, illustrating the crank-shaft bearings and method of fixing the same in place; Figs. 15 to 19 inclusive show the several bearing blocks comprising the crank-shaft bearings in the illustrated example; Figs. 20 to 24 inclusive show the various wedges whereby said bearing blocks are secured in position; Fig. 25 is a side view, partly in section, of another form of a double ended piston; Fig. 26 is a detail cross section on the line 26—26 of Fig. 25; Fig. 27 is a similar view, partly in section, showing another form of piston; Fig. 28 is a detail end view of the bearing channels of Fig. 27; Fig. 29 is a corresponding view of a further form of piston, and Fig. 30 is a section on the line 30—30 of Fig. 29.

In the illustrated example the invention is embodied in an internal combustion engine comprising a unit consisting of multiple cylinders preferably cast integrally with each other, in the form of four duplicate units including eight cylinders located in opposed groups, and arranged in axially opposed pairs, the two cylinders of each pair having their inner or opposed ends spaced apart and facing each other. The respective cylinders in each group located upon opposite sides of the longitudinal center line of the engine are indicated in Fig. 2 as 35, 36, 37 and 38 upon one side and as 35$^a$, 36$^a$, 37$^a$ and 38$^a$ upon the other side of said center line. For the purpose of simplifying the description I will describe one of the units of the engine, as shown for instance in Fig. 3, it being understood that the description will apply to all of the units, all of which are duplicates of each other in constructive details. As shown piston members 39 and 39$^a$, which together constitute a double ended piston, are slidable in the cylinders 35 and 35$^a$ respectively, similar double-ended pistons being mounted for reciprocation in the respective cylinders 36, 36$^a$, 37, 37$^a$, 38 and 38$^a$ as is clearly shown in Fig. 2. The piston members 39 and 39$^a$ of each double ended piston in this form are fixed in axial alignment and in spaced relation with each other by means of webs or bridges 40, said piston members and webs in the preferred construction being cast in one piece of suitable metal. The piston members 39 and 39$^a$ include circumferential grooves 41 for the accommodation of piston rings 41$^a$ and are further provided with oil grooves 42 in the conventional manner. At their opposed ends the piston members 39 and 39$^a$ are each provided with oppositely located bearing channels 43 facing each other in spaced parallel relation in the spaces between the piston members and adapted to slidably accommodate sliding blocks 44 which are connected with the crank pins 45 of a crank shaft 46. In the preferred arrangement the guideways 43 are formed with transversely curved and finished surfaces as shown in Fig. 8 and the blocks 44 are correspondingly curved to fit said surfaces as illustrated in Fig. 11; this arrangement permits the blocks 44 to adjust themselves to any slight errors in alignment of the cylinder center lines or the center lines of the piston members 39 and 39ª, it being understood that the blocks 44 have sufficient lateral play upon the crank pins 45 to allow said blocks to adjust themselves to the curved surfaces of said bearing channels 43. The channels 43 have their upper and lower ends free and unobstructed to permit the sliding blocks 44, in their travel, to project out of said bearing channels beyond the outer circumferential surfaces of the piston members 39 and 39ª thereby enabling the strokes of the pistons to be increased to a material extent. In the form shown in Figs. 1 to 14, the bearing channels 43 are arranged at predetermined inclinations to the axis of the double ended piston of which they form parts, or in other words are inclined at a predetermined angle across the axis of reciprocation of said double ended piston, the inclination or angle being in the direction of the axis of the piston and, in addition to other advantages, making it possible to still further increase the piston stroke. The arrangement is such that the arms $a$ of the cranks of the crank shaft 46 travel in the spaces between the blocks 44 and the webs or bridges 40, the latter being arranged to provide the necessary clearance and the crank shaft 46 being substantially so proportioned that the throws of the cranks thereof define paths which are located within the spaces defined by the cylinder bores. The confining of the throws of the cranks within the diameter of the piston is conducive of the inherent balancing and counter-balancing characterizing my engine. In order to permit ready assembling and disassembling of the parts, the blocks 44 as shown in Figs. 10, 11, and 12, are made in two complemental sections $b$ fitted together and recessed at their opposite ends to provide mating projections $c$ for the accommodation of wires $d$ or other suitable releasable fastening means whereby the sections $b$ of each block are separably secured together upon the crank pins 45. The crank shaft 46 is located in a plane practially coincidental with a plane passing horizontally through the center lines of the cylinders and is journalled in bearings 47 located in upwardly open recesses 48 with which the cylinder castings are provided as illustrated in Fig. 14. The bearings 47 each consist of two complemental sections fitted together about said crank shaft and shaped for instance as indicated in Figs. 15–19 to properly fit into the power plant at the different points at which said bearings are located. These bearings 47 are removably fixed in their intended positions by suitable means which in the illustrated example are shown in the form of wedges 49 arranged to be wedged between said bearings 47 and adjacent walls of the recesses 48; in order to provide the desired wedging action the opposite walls of the recesses 48 diverge upwardly as shown in Fig. 14 so that downwardly converging spaces are provided between each of the blocks 47 and the one wall of each of said recesses. The wedges 49 are shaped and dimensioned for instance as indicated in Figs. 20–24 to fit into the power plant in proper relation to the cooperating bearings 47 and preferably include devices for positioning said wedge, these devices being illustrated as pins 50 adapted to project into sockets 51 as shown in Fig. 14. In the preferred construction means are provided for adjusting the wedges 49 to and from their operative positions and forcing said wedges 49 into operative positions and for locking them therein, said means being illustrated in the drawings in the form of set screws 52 rotatably connected with the wedges and extending through and in screw-threaded engagement with lugs 53 extending over and in registry with the recesses 48 and located upon the cylinder castings as shown in Figs. 3 and 14; lock-nuts 54 serve to fix the screws 52 in adjusted positions against unintentional operation. It will be seen that an operation of the screws 52 will either force the wedges 49 into wedging positions or withdraw them therefrom, this depending upon the direction of rotation of said screws, and that accordingly the crank shaft 46 may be released for removal and replaced in position in a very simple manner. After the wedges 49 have been adjusted to releasing positions, the crank shaft 46 may easily be lifted out of the engine through the recesses 48, the blocks 44 being coincidentally lifted from the bearing channels 43; it will of course be understood that the pistons are all adjusted to intermediate positions to bring the channels into registry with the recesses 48 in order that the above mentioned removal of parts may be accomplished. The crank shaft 46 may carry a fly-wheel 55 combined with a gear 56 adapting it for connection with a starting device in the manner customary in internal combustion engines.

The cylinder heads 57 are separate from the cylinder castings and are detachably connected therewith by means of bolts 58 or equivalent devices, suitable gaskets being provided to insure fluid tight joints between the heads 57 and the cylinders. With this arrangement the cylinder heads may be easily and quickly removed when access to the interiors of the cylinders is desired or to permit the removal of the pistons, subsequently to the removal of the crank shaft 46.

The cylinder heads 57 comprise closures for the combustion chambers *e* and *e'* of each pair of cylinders and are tapped at 59 for the accommodation of spark plugs or other suitable ignition devices; the taps 59 are inclined with respect to the axes of the cylinders so that the spark plugs, when in place therein, will occupy inclined positions and thereby prevent oil from lodging thereon. Each combustion chamber *e* and *e'* is provided with an intake or inlet valve 60 controlling the connection between a combustion chamber and an intake manifold 61 cast in one with the cylinders, and with an exhaust valve 62 controlling the communication between a combustion chamber and an exhaust passage 63 formed in the casting and leading to an exhaust manifold 64 which as usual is a separate element bolted in place on the cylinder castings. The inlet manifolds 61 run from end to end of the cylinder castings adjacent to the exhaust outlets 63 as shown in Fig. 3 so that the fuel mixture in the manifolds 61 absorbs heat from the outgoing exhaust gases and thereby preheats the fuel mixtures and at the same time cools the exhaust gases. As shown in Fig. 3 the valves 60 and 62 are carried by stems 65 which incline upwardly and inwardly so that the valve stems of the groups of cylinders on opposite sides of the engine converge upwardly toward a common line parallel and in registry with the axial line of the crank shaft 46 as shown in Fig. 3. The valve stems 65 are slidable in bushings 66 which are removably fitted into bearing sleeves 67 cast as integral parts of the cylinder block at the proper angles of inclination as shown in Fig. 3. The valves 60 and 62 are maintained in and returned to their closed positions by means of springs 68 which bear with one end against the cylinder casting and with the other end against a disk 69 fixed upon each of said stems 65 as illustrated in Fig. 3. If desired felt washers 70 may be fitted upon the stems 65 between the disks 69 and the sleeves 67 for the purpose of catching and retaining oil as will appear more fully hereinafter. The valves 60 and 62 are operated at the proper moments and in proper sequence by cams 71 and 72 respectively, said cams being carried by a cam shaft 73 located at a distance above and in registry with the crank-shaft 46 and being common to all of the valves 60 and 62 of each group of cylinders. In other words the valves 60 and 62 of the opposite groups of cylinders, that is the stems of said valves, incline or converge toward said cam-shaft 73. The latter is journalled in brackets 74 bolted upon the cylinder casting and as shown in Fig. 3 runs in oil contained in a trough 75 carried by the brackets 74 which are secured upon the cylinder casting to one side of the recesses 48 as illustrated in Fig. 3, so as not to interfere with the previously described removal and replacement of the crank shaft 46. The cams 71 and 72 act upon tappets 76 slidably mounted in bearings 77 forming part of the brackets 74 and trough 75, said tappets being provided with recesses 78 for the reception of the ends of removable rods or spacing members 79 as indicated in Fig. 3. The opposite ends of the rods 79 terminate in sockets 80 into which the ends of the valve stems 65 project as shown in Fig. 3, the tension of the springs 68 serving to maintain the rods 79 in proper connection with the valve stems 65 and tappets 76; in order to permit the length of the rods 79 to be adjusted within predetermined limits the sockets 80, as illustrated in Fig. 3, may comprise separate elements screwed upon the rods 79 and fixed in their adjusted positions by means of lock nuts 81. It will be obvious that these rods 79 may be easily removed, when for any reason this is desired, by simply depressing the valves against the tension of the springs 68, a distance sufficient to withdraw the ends of the stems 65 from the sockets 80. The cam shaft 73 may be operated in any suitable manner in proper timing with the other mechanical parts and in the illustrated example is operatively connected with the crank shaft 46 by means of a chain 82 and sprockets 83 and 83ª located respectively upon the crank shaft 46 and the cam shaft 73; the sprockets 83 and 83ª are dimensioned to provide the relative ratio of rotation between the shafts 46 and 73 which is necessary to the proper operation of the parts. In the preferred arrangement a protecting cover 84 is mounted upon the cylinder casting so as to completely enclose the cam shaft 73 and its associated elements and also to cover the oil trough 75, said cover being removably fastened in place in any conventional manner. If desired this cover may include a transparent window to permit the working of the inner parts to be observed.

It will be noted that the bearings 77 communicate with the oil trough 75 so that oil seeps along the tappets 76, rods 79 and valve stems 65 and is caught and retained by the felt washers 70 which thereby serve to lubricate the valve stems 65 and prevent them from sticking.

The cylinder casting is fitted with end plates 85 suitably secured in place in registry with the recesses 48 as shown in Fig. 4, said end plates including upwardly open slots 86 inclined at angles corresponding to the inclinations of the recesses 48 and provided with guide grooves in their opposite edges as shown in Figs. 2 and 4. The grooves of said slots 86 are adapted to slidably receive closure plates 87 and 88 which are slotted as indicated respectively at 89 and 90 to fit the crank shaft 46; the slots 89 and 90 are off-set with respect to each other so that as each pair of plates 87 and 88, in surface engagement with each other, are fitted into the grooves of the slots 86 the latter will be completely closed and the crank-shaft 46 will be completely enclosed circumferentially. This arrangement prevents oil from splashing out of the engine while in operation and at the same time permits the removal of the crank shaft 46 without requiring the end plates 85 to be first removed. In replacing the crank shaft 46 in the engine the closure plates 87 and 88 are first combined therewith by fitting the slots 89 and 90 over the crank shaft and in this condition the plates 87 and 88 are slidden into the grooves of the slots 86 to completely close the same.

Any suitable type of lubrication may be used such as a force feed through the top of each cylinder to the oil grooves 42 of the pistons, which serve also to lubricate the sliding blocks 44 when the pistons are at the ends of their travel. The splash system of lubrication may also be used for lubricating the engine if desired.

In the illustrated example the engine is provided with an oil trough 91 running lengthwise at the bottom of the cylinder casting in registry with the crank shaft 46. If the forced feed system is used a suitable oil pump will be included in the plant and if the lubrication is of the splash type suitable provision of any conventional type will be made for splashing the oil.

Wherever it is necessary provision is also made for cooling the apparatus, the illustrated example accordingly being provided with water jackets 92 surrounding the cylinders and being located between the latter and the intake manifolds 61 as shown in Fig. 3. The water jackets 92 furthermore extend also about the oil trough 91 as illustrated in Fig. 3 and serve to cool the oil therein; the cylinder heads 57 are also water jacketed as indicated at 93. It will be understood that the water jackets 92 and 93 comprise part of the cooling system in which provision is made in any customary manner for causing a circulation of water or other cooling medium through said water jackets.

In the operation of the engine of the illustrated example the fuel mixture is compressed in the combustion chambers e and e' by the action of the piston members 39 and 39ª and exploded to develop power strokes in said pistons, after which the combustion chambers are scavenged and new charges of fuel mixture are drawn in. In other words each piston member describes an operative cycle consisting of compression, explosion, scavenging, and suction strokes, the operative cycles of the two members of each piston being arranged in proper relation to each other to bring about the desired operation, and the operative cycles of the pistons in the different cylinders being correspondingly arranged with respect to each other to produce the desired operative results. For instance when explosion occurs in a combustion chamber e and is effective upon the piston member 39, the other piston member 39ª will be on compression stroke, and when the piston member 39ª is on its explosion stroke, the piston member 39 will be on its exhaust stroke. In the case of an internal combustion engine such as is illustrated, the fuel mixture as it is compressed or the exhaust gases as they are forced out of the cylinder provide a cushioning effect on the piston which serves to a great extent to absorb the inertia of the pistons particularly at the ends of their strokes.

As the pistons, in the illustrated example, are operated as set forth, the blocks 44, because of the inclination of the guide slots 43, are subjected to a wedging action, upwardly in one direction of movement of said pistons and downwardly in the opposite directions thereof. As a result of this the crank shaft 46 will be rotated and in turn will communicate motion to the cam shaft 73 and to any mechanism, such as the running gear of an automobile with which the plant may be connected. In other words, the relative reciprocating movements of the double ended pistons are translated into rotary motion in the crank shaft 46; in some classes of power plants the rotary motion of the crank shaft 46 or its equivalent may be translated into reciprocating motion in the pistons. It will, of course, be understood that the engine of the illustrated example includes suitable instrumentalities for controlling and bringing about the ignition of the spark plugs or their equivalent and that any other elements necessary in any case to provide a complete mechanism are included in the plant.

Because of the fact that no crank case is required and that connecting rods and wrist pins are done away with, an internal combustion engine embodying the invention may be made of greatly reduced size and weight per horse power so that the cost of production is reduced to a minimum. The reduction in weight which is possible also reduces the development of destructive forces to a minimum, when the plant is in operation, and thereby increases its life and period of usefulness. In addition to this the engine is perfectly balanced because of the fact that it has no connecting rods and wrist pins and further because the two intermediate cranks of the crank shaft 46 extend in the same radial direction and the two outer end cranks both point in the opposite direction at 180° from the intermediate cranks. Thus the eight cylinder unit of the illustrated example is inherently balanced, as all of the pistons are of the same weight equally distributed and no unbalancing forces are developed by connecting rods and the like.

It will be noted that each cam 71 and 72 of the cam-shaft 73 serves to operate two valves located on opposite cylinders or in opposite combustion chambers, so that the sixteen valves of the illustrated example are controlled by eight cams, thus reducing this part of the mechanism to a very simple arrangement. The valve stems 65 slide in bushings 67 which may be removed and replaced when worn or to compensate for wear on said stems, whereby the life of these elements is increased to a maximum extent.

While it is preferred in many forms in which the invention may be embodied to have the guideways 43 inclined at an angle transversely to the major axis of the double ended piston, for instance as shown in Fig. 3, it may be desirable to arrange said guideways at right angles to said major axis for instance as shown in Figs. 25 and 27, the upper and lower ends of said guideways being free and unobstructed as in the form shown in Fig. 3 and preferably having transversely curved surfaces for the accommodation of correspondingly curved sliding blocks 44 connected with the crank shaft 46 as in the form first described. Because of the fact that in Fig. 25 the guideways $43^a$ are arranged at right angles to the major axis of the piston by which they are carried, said guideways $43^a$ may project outwardly beyond the peripheral surfaces of the piston members 39 and $39^a$, to provide paths of increased length for the blocks 44 whereby the strokes of the pistons may be still further increased. The piston members 39 and $39^a$ of the piston shown in Fig. 25 are connected in spaced axial relation by webs or bridges 40 as in the form shown in Figs. 3, 7, and 8, it being understood that the piston of Fig. 25 may otherwise be the same as the one illustrated in Figs 3, 7, and 8.

In cases where the guideways extend outwardly beyond the piston surfaces as shown in Fig. 25 the guideways $43^a$ are removably fixed in place upon the pistons at the opposed ends of the piston members 39 and $39^a$, in any convenient manner. For instance as shown in Fig. 25 the guideways $43^a$ may each be provided with dove-tail ribs 94 slidably fitted into corresponding grooves provided in the opposed ends of the piston members 39 and $39^a$. As shown in Fig. 25 the piston members 39 and $39^a$ include lugs 95 for supporting ears 96 projecting outwardly from the guideways $43^a$, the lugs and ears being detachably secured together by means of bolts 97 which pass through the ears 96 and screw into the lugs 95. In order to avoid the presence of projections outwardly beyond the peripheral surfaces of the piston members 39 and $39^a$ which might interfere with their intended reciprocation in the cylinders, the heads of the bolts 97 are countersunk in the ears 96 and the latter are located in recesses 98 formed in the cylinder members 39 and $39^a$. In all other respects the pistons may be constructed as in the form first described.

With the arrangement set forth it is necessary only to remove the bolts 97 when it is desired to disconnect the guideways $43^a$ from the piston members 39 and $39^a$ when for any reason this is required as for instance to permit the complete withdrawal of the pistons from the cylinders.

The means whereby the piston members 39 and $39^a$ are connected to form a double ended piston may vary although the casting of said members with the ribs 40 or their equivalent may be said to be the preferred form. For instance as shown in Figs. 27 and 28, the guideways $43^b$ which correspond to the previously mentioned guideways 43 and $43^a$ may be provided at opposite ends with webs $40^a$ either cast as integral parts of said guideways or otherwise connected therewith and in any case serving to maintain said guideways in predetermined fixed spaced relation, and by reason of the connection of side guideways with said piston members 39 and $39^a$ serving also to fix the latter in their intended spaced axial alignment. With such a construction the piston members 39 and $39^a$ are cast or otherwise produced as separate and independent elements, but otherwise may include all of the features present in the piston members of the other forms of the invention. The connection between the guideways $43^b$ and the piston members 39 and $39^a$ may be permanent or said connection may be such as to permit the removal of the guideways and the consequent separation of the piston members 39 and $39^a$ at will. When the connections are of the detachable type the guideways $43^b$ may project outwardly beyond the piston members 39 and $39^a$, as indicated in Fig. 27, to increase the piston strokes as much as may be desired. The means whereby the detachable connection is effected between the piston members 39 and $39^a$ and the guideways may be of any convenient form for instance as shown in Fig. 25 or as is illustrated in Fig. 27. In the latter case the guideways $43^b$ are provided with ribs $94^a$ slidably fitted into corresponding grooves formed in the piston members 39 and $39^a$. For the purpose of fixing the guideways $43^a$ against movement in the direction of their length relatively to the piston sections, the latter may be provided with lugs $95^a$ and $95^b$ located in spaced registry with each other, the upper lugs $95^a$ having screw-threaded apertures and the lower lugs $95^b$ being formed with openings in registry with said apertures as shown in Fig. 27; in such case the guideways $43^b$ each include ears $96^a$ and $96^b$ provided with registering openings, the upper ears 96ᵃ projecting beneath the upper lugs 95ᵃ and the lower ears 96ᵇ resting upon the lower lugs 95ᵇ with the openings of said ears in alignment respectively with the screw-threaded apertures of the upper lugs and the openings of the lower lugs as illustrated in Fig. 27. In order to removably fasten the guideways in place, bolts 97ᵃ are in screw-threaded engagement with the upper lugs 95ᵃ and have stems 97ᵇ which pass through the openings of the ears 96ᵃ and 96ᵇ and into the openings of the lower lugs 95ᵇ; in the preferred arrangement the heads of the bolts 97ᵃ are located in recesses 98ᵃ formed in the cylinder members 39 and 39ᵃ in order to avoid any projections which might interfere with the intended reciprocation of the piston members in the respective cylinders.

Obviously with the arrangement set forth, the removal of the bolts 97ᵃ will permit the piston members 39 and 39ᵃ to be separated from the guideways 43ᵇ when for any reason this is required as for instance when it is desired to withdraw said piston members from their respective cylinders.

As shown in Figs. 29 and 30, the piston members 39 and 39ᵃ may be connected together in axial alignment by removable webs or bridges 40ᵇ which may be used either alone or in conjunction with the fixed webs or bridges 40 as shown in Fig. 29. The webs or bridges 40ᵇ are secured in place by means of bolts 99 or equivalent devices and preferably have their ends countersunk in the piston members 39 and 39ᵃ so as to lie flush with the peripheral surfaces thereof.

It will be understood that the features shown in Figs. 25, 26, 27, 29 and 30 may be incorporated in the form of the invention shown in Figs. 1 to 24 inclusive, and that the web arrangement of Figs. 29 and 30 may be utilized in the form of the invention illustrated in Figs. 25 to 28 inclusive.

While the novel features of the invention adapt it particularly for embodiment in internal combustion engines it is not restricted to this use and in practice may be efficiently incorporated in any power unit which includes pistons or equivalent elements. For instance it may be developed as power plants for aeroplanes, motor boats, locomotives, stationary engines, as well as in the form of pumps, compressors and other structures for which the mechanical elements of the invention are adapted.

Any mechanical unit which embodies the novel features of the invention is simple and compact in design, with the overall dimensions exceptionally small per horse power, and operates powerfully and smoothly with a maximum lack of noise and with practically no vibration. The inherent qualities of such plants are such that the stresses developed on bearings and other parts are reduced to a minimum and thereby result in a very high mechanical efficiency so that, although the plant may be very powerful in operation it is at the same time economical in the matter of fuel and oil consumption. When constructed in the form of an internal combustion engine, the plant is easy to start because of the dual ignition. The simplicity of design also reduces the cost of repairs when these become necessary and reduces the assembling and disassembling, and consequently the overhauling of the plant, to the simplest kind of an operation.

Various changes in the specific form shown and described may be made within the scope of the claims without departing from the spirit of the invention.

I claim:

1. A power plant comprising a pair of axially opposed cylinders having their opposed ends spaced apart, a double ended piston in axial registry with and slidable in the respective cylinders, spaced parallel bearing channels in said piston in the space between the opposed ends thereof, said channels being inclined at a predetermined angle across the axis of reciprocation of the double ended piston, and within the space defined by the cylinder bore, a crank-shaft having its crank throw entirely within the piston diameter, and a block connected with said crank-shaft and slidably mounted in said channels whereby the reciprocatory motion of said piston is translated into rotary motion in said crank shaft or vice versa.

2. A power plant comprising a unit consisting of multiple cylinders located in axially opposed pairs and having their opposed ends spaced apart, double ended piston slidable in said cylinders in predetermined relation, spaced parallel channels in said piston in the spaces between the opposed ends thereof and within the space defined by the cylinder bore, a crank-shaft having its crank throw entirely within the piston diameter, and bearing blocks connected with said crank-shaft and slidably mounted in said channels whereby the relative reciprocating movements of said double ended pistons are translated into rotary motion in said crank-shaft or vice versa.

3. A power plant comprising a unit consisting of multiple cylinders located in axially opposed pairs and having their opposed ends spaced apart, double ended pistons slidable in said cylinders in predetermined relation, spaced parallel channels in said piston in the spaces between the opposed ends thereof, said channels being all inclined at predetermined angles across the axes of reciprocation of said double ended pistons and within the space defined by the cylinder bore, a crank-shaft having its crank throw entirely within the piston diameter, and bearing blocks connected with said crank-shaft and slidably mounted in said channels whereby the relative reciprocating movements of said double ended pistons are translated into rotary motion in said crank-shaft or vice versa.

4. A power plant comprising a pair of axially opposed cylinders having their opposed ends spaced apart, piston members slidable in its respective cylinders and located in spaced, axial registry, bridges extending between said piston members and uniting the same in said spaced registry to form a double ended piston, spaced parallel bearing channels on said piston members in the space between the opposed ends thereof and within the space defined by the cylinder bore, having their opposite ends free and unobstructed, said channels being inclined at a predetermined angle across the axis of reciprocation of the double ended piston, a crank-shaft having its crank throw entirely within the piston diameter, and a block connected with said crank-shaft and slidable in said channels whereby the reciprocating motion of said double ended piston is translated into rotary motion in said crank-shaft or vice versa.

5. In an internal combustion engine, the combination of a plurality of opposed cylinders cast integral with each other and arranged horizontally in pairs in spaced axial alignment, to provide an upwardly open space continuous throughout the axial length of the engine, double ended pistons slidably mounted in said cylinders and including upwardly open intermediate spaces, a crank-shaft having its crank throw entirely within the piston diameter, and located in said space and upwardly removable therefrom, and detachable connections between said crank-shaft and pistons whereby the reciprocating movements of the latter are translated into rotary motion in said crank-shaft.

6. In a power plant, the combination of a pair of axially opposed cylinders having their opposed ends spaced apart, a double ended piston in axial registry with and slidable in the respective cylinders, spaced parallel bearing channels in said piston in the space between the spaced ends thereof and provided with transversely curved channel surfaces, said channels being inclined at a predetermined angle across the axis of reciprocation of said double ended piston and within the space defined by the cylinder bore, a crank-shaft having its crank throw entirely within the piston diameter and a block consisting of connected, separable sections slidable in said channels and curved to fit the channel surfaces thereof, said block being connected with said crank-shaft whereby the reciprocating movements of the double ended piston are translated into rotary motion in said crank-shaft.

In testimony whereof I have hereunto set my hand.

JOHN A. BOSMANS.